United States Patent Office 3,350,409
Patented Oct. 31, 1967

3,350,409
VAPOR PHASE RING CLOSURE
Harold A. Kaufman, Piscataway Township, New Brunswick, Ross A. Kremer, Edison, and Patrick Robert Driscoll, Highland Park, N.J., assignors to Mobil Oil Corporation, a corporation of New York
No Drawing. Filed Apr. 2, 1965, Ser. No. 445,242
6 Claims. (Cl. 260—332.3)

This invention relates to the formation of cyclic ketones by ring closure. It is more particularly concerned with the formation of cyclic ketones by vapor phase catalytic cyclization of aryl-substituted lower alkanoic acids.

It has been proposed to prepare cyclic ketones by a two-step intramolecular acylation of aryl-substituted lower alkanoic acids, e.g., 4-keto-4,5,6,7-tetrahydrothionaphthene from 4-(2-thienyl)butyric acid or α-tetralone from phenylbutyric acid. The acid is first converted to the corresponding acyl chloride with thionyl chloride. Then, the acyl chloride is cyclized in the presence of stannic chloride. This two-step method is disadvantageous, because it is necessary to use very pure acyl chloride in the cyclization step. The acyl chloride, however, is unstable and difficult to keep in a pure state. Consequently, yields are erratic and reproducibility of results is poor. It has also been proposed to convert phenylbutyric acid directly into α-tetralone by liquid phase reaction in the presence of agents such as stannic chloride, phosphorus pentoxide, and sulfuric acid. Stannic chloride gives low yields. Both phosphorus pentoxide and sulfuric acid in the liquid phase cyclizations promoted undesirable ketone condensation side reactions. The aforedescribed processes have been sufficient for small scale laboratory preparation purposes. For producing commercial quantities of cyclic ketones, however, a facile process for effecting the direct intramolecular acylation of aryl-substituted alkanoic acids is highly desirable.

The cyclic ketones contemplated herein are useful per se and as intermediates for producing carbamate insecticides. Thus, alpha-tetralone protects wool and fur from the clothes-moth and other insects [Elsevier's Encyclopedia of Organic Chemistry, Series III, volume 12B, page 2543 (1950)].

4-keto-4,5,6,7-tetrahydrothionaphthene can be converted to 4 - hydroxyethionaphthene (4 - hydroxybenzothiophene) by reaction with sulphur [Fieser and Kennelly, J. Am. Chem. Soc., 57, 1611 (at 1615) (1935)]. 4-hydroxybenzothiophene and derivatives thereof can be converted to benzothienyl carbamate insecticides, using known techniques (Belgian Patent No. 638,684).

It has now been found that aryl-substituted alkanoic acids can be converted into cyclic ketones by a method that is relatively simple and economically feasible. It has been discovered that aryl-substituted alkanoic acids will readily undergo direct intramolecular acylation in a catalytic process carried out in the vapor phase.

Accordingly it is a broad object of this invention to provide a novel catalytic process for producing cyclic ketones. Another object is to provide a facile process for effecting intramolecular acylation of aryl-substituted alkanoic acids. A specific object is to provide a catalytic vapor phase process for converting aryl-substituted alkanoic acids into cyclic ketones by means of intramolecular acylation. A particularly specific object is to provide a catalytic vapor phase process for converting 4-(2-thienyl) butyric acid to 4-keto-4,5,6,7-tetrahydrothionaphthene. Other objects and advantages of this invention will become apparent to those skilled in the art, from the following detailed description.

In general this invention provides a process for converting aryl-substituted lower alkanoic acids to cyclic ketones that comprises contacting, in the vapor phase, an acid having the formula, $Ar(CH_2)_nCOOH$, wherein Ar is an aromatic cyclic (heterocyclic or carbocyclic) radical and $n$ is 2–4, with a dehydration catalyst.

The aryl-substituted lower alkanoic acid reactant that is converted to a cyclic ketone in the process of this invention has the formula $Ar(CH_2)_nCOOH$, where Ar is an aromatic cyclic radical and $n$ is an integer, 2, 3, or 4. The term "aromatic" is used, in this specification and the claims, in its broad sense to include heterocyclic as well as carbocyclic ring. In general, it includes ring compound radicals that are aromatic in nature. Thus, Ar can be an aromatic heterocyclic radical, such as thienyl, furyl, pyridyl, benzothienyl, and benzofuryl, or an aromatic carbocyclic radical, such as phenyl and naphthyl. The Ar substituent can have other groups substituted in the ring that will not interfere with the reaction, such as alkyl and halogen. Ordinarily, however, the Ar substituent will be unsubstituted, but if it is substituted the carbon atom adjacent the carbon atom that is attached to the alkanoic acid must be unsubstituted. Typical compounds that can be cyclized by the process of this invention are 4-(2-thienyl) butyric acid, 4-(2-furyl)butyric acid, phenylbutyric acid, 3-(2-thienyl)propionic acid, 3-(2-furyl)propionic acid, α-naphthylpropionic acid, 4-(2-pyridyl)butyric acid, 5-(2-thienyl)-n-pentanoic acid, phenyl-n-pentanoic acid, and 5-(2-furyl)-n-pentanoic acid.

The reaction involved in the process of this invention is essentially a dehydration reaction. Accordingly, it is catalyzed by a dehydration catalyst. Although any of the dehydration catalysts well known in the art can be used, some are more effective than others. Both solid and liquid dehydration catalysts are contemplated, either alone or on a suitable support, such as alumina, alundum, ceramic saddles, etc. The catalysts found to be particularly effective are $WO_3$, aluminum orthophosphate, phosphoric acid and other oxyacids of phosphorus, and phosphorus pentoxide. Non-limiting examples of dehydration catalysts utilizable herein are phosphoric acid, sulfuric acid, phosphoric acid on alumina, sulfuric acid on alumina, alumina, phosphorus pentoxide, tungsten oxide and oxides, of Th, Ti, Zr and Mo, acid activated clays, such as acid activated montmorillonite, and salts of phosphoric acid such as $AlPO_4$, $$Ca_3(PO_4)_2$$

etc.

The process of this invention is carried out in the vapor phase. Accordingly, the reaction temperature will be at least the boiling point of the aryl-substituted alkanoic acid reactant and higher. In general, temperatures of between about 250° C. and about 550° C. are utilizable, depending in part upon the catalyst used. Temperatures of between about 350° C. and about 475° C. are most effective and are preferred. The reaction is carried out in a relatively short contact time which, varying inversely with the reaction temperature, will be between about 0.5 second and about 5 seconds.

The process of this invention can be carried out batchwise. It is, however, most feasibly carried out continuously. When using a solid catalyst, such as tungsten trioxide, the acid reactant can be passed through a heated static bed of catalyst. Liquid catalyst, e.g. sulfuric acid, can be charged with the acid reactant and passed through a heated bed of inert solids, such as ceramic saddles. In the case of supported normally liquid catalysts, such as phosphoric acid supported on alundum, it is often feasible to charge additional liquid (phosphoric) acid along with the feed, in order to maintain catalyst activity. Movement of reactant and reaction products through the reactor bed can be facilitated by using an inert sweep or carrier gas, such as nitrogen or flue gas.

The following examples demonstrate the process of this invention is the conversion of 4-(2-thienyl)butyric acid to 4-keto-4,5,6,7-tetrahydrothionaphthene. It must be understood that other aryl-substituted alkanoic acid reactants and catalysts, as set forth hereinbefore, can be employed.

Example 1

The reaction system used comprised a tubular reaction vessel containing a static bed of catalyst and provided with means to heat the catalyst bed. The inlet to the reactor comprised an opening for introducing reactant and a preheater section, and openings for introducing nitrogen carrier gas and liquid catalyst (phosphoric acid). The outlet from the reactor was provided with a condenser section and a receiver for the reaction product.

The catalyst used in this run was prepared by pouring 90 g. of 85% orthophosphoric acid over 300 g. of alundum balls and heating to dryness with occasional stirring. Heating time was about 2½ hours.

The acid reactant, 4-(2-thienyl)butyric acid, was charged in a vapor state to the reactor, containing 142 cc. of the phosphoric acid of alundum catalyst at a temperature of 400° C. The acid reactant was charged at a rate of 1.778 cc. per minute, corresponding to an LHSV of 0.75 (0.0747 min. contact time). Nitrogen carrier gas was fed at the rate of 497 cc. per minute. There were added 6.5 ml. of 85% phosphoric acid during the addition of acid reactant at the rate of 0.016 cc./min. There was a total recovery of 97%, which was found by vapor phase chromatography to contain 95% 4-keto-4,5,6,7-tetrahydrothionaphthene, 2% unreacted 4-(2-thienyl)butyric acid (recyclable), and 3% byproducts, all by weight. The cyclic ketone product was identified by comparison with a standard, by infrared analysis. It was characterized chemically by converting it to 4-hydroxybenzothiophene.

Examples 2 through 9

A series of runs was carried out for converting 4-(2-thienyl)butyric acid into 4-keto-4,5,6,7-tetrahydrothionaphthene. In each run, a different dehydration catalyst was used. Pertinent process conditions and yields of 4-keto-4,5,6,7-tetrahydrothionaphthene in each run are set forth in the table.

TABLE

| Example | Catalyst | Cat. Vol., cc. | Charge Rate, cc./min. N$_2$ | Charge Rate, cc./min. TBA [1] | Contact Time, sec. | Temp., °C. | Yield, wt. percent [2] |
|---|---|---|---|---|---|---|---|
| 2 | AlPO$_4$ | 13 | 140 | 0.35 | 2 | 375 | 100 |
| 3 | Ca$_3$(PO$_4$)$_2$ | 15 | 160 | 0.40 | 2 | 400 | 93.4 |
| 4 | P$_2$O$_5$ (15.5%) on Alundum | 40 | 140 | 0.50 | 4 | 400 | 99.2 [3] |
| 5 | WO$_3$ (10%) on Al$_2$O$_3$ | 15 | 260 | 0.70 | 1 | 390 | 78.6 |
| 6 | WO$_3$ (95%) on Al$_2$O$_3$ | 15 | 527 | 1.40 | 0.5 | 400 | 75.0 |
| 7 | Al$_2$O$_3$ | 15 | 131 | 0.36 | 2.2 | 397 | 34.1 |
| 8 | Cr$_2$O$_3$ (33%) | 15 | 160 | 0.40 | 2 | 400 | 38.8 |
| 9 | Montmorillonite | 15 | 160 | 0.40 | 2 | 400 | 11.8 |

[1] 4-(2-thienyl)butyric acid.
[2] Yield 4-keto-4,5,6,7-tetrahydrothionaphthene.
[3] Added 85% H$_3$PO$_4$ at 0.0125 cc./min. to maintain activity.

It will be noted that the process of this invention converts an aryl-substituted alkanoic acid to the corresponding cyclic ketone in good yield. Various catalysts are effective, but all are not equally effective. When yields per pass are low, however, recycling unconverted aryl-substituted alkanoic acid will afford good ultimate yields.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing 4-keto-4,5,6,7-tetrahydrobenzothiophene that comprises contacting 4-(2-thienyl)butyric acid, in the vapor phase, with a dehydration catalyst selected from the group consisting of phosphoric acid, sulfuric acid, phosphoric acid on alumina, sulfuric acid on alumina, alumina, phosphorus pentoxide, tungsten oxide, oxides of Th, Ti, Zr and Mo, acid activated montmorillonite, AlPO$_4$, and Ca$_3$(PO$_4$)$_2$.

2. The process defined in claim 1, wherein said dehydration catalyst is orthophosphoric acid.

3. The process defined in claim 1, wherein said dehydration catalyst is aluminum phosphate.

4. The process defined in claim 1, wherein said dehydration catalyst is calcium phosphate.

5. The process defined in claim 1, wherein said dehydration catalyst is phosphorus pentoxide.

6. The process defined in claim 1, wherein said dehydration catalyst is tungsten trioxide.

References Cited

Berkman, Catalysis, Reinhold Pub. Corp., N.Y. 1940, pp. 656, 743, 744, 745.

Krollpfeiffer, Chemische Berichte 56, 620 to 623 (1963).

Meyer, Synthese der Kohlenstoffverbindungen, Edwards Bros., Ann Arbor, Mich., 1943, Zweiter Teil, Heterocyclen, I. Halfte., pp. 73, 625.

JOHN D. RANDOLPH, *Primary Examiner.*

WALTER A. MODANCE, *Examiner.*

C. M. SHURKO, *Assistant Examiner.*